United States Patent Office 2,918,419
Patented Dec. 22, 1959

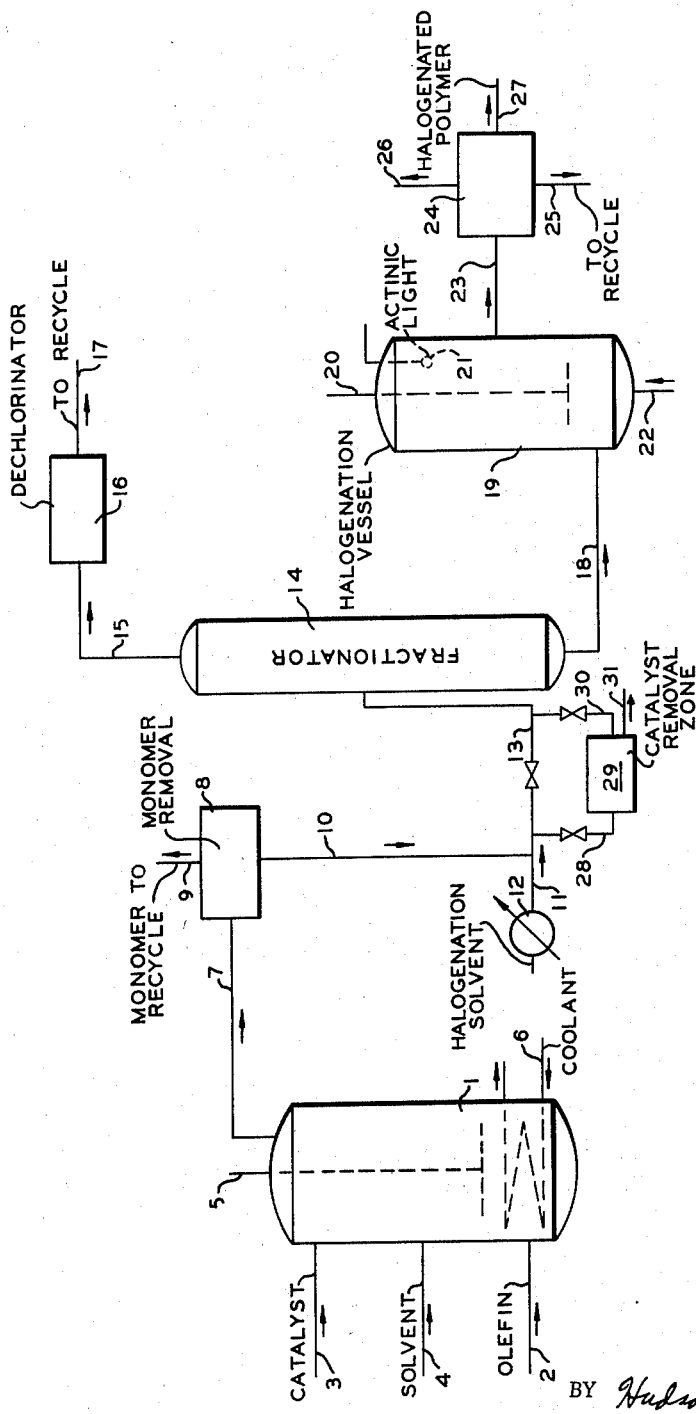

2,918,419

CONTINUOUS PROCESS FOR PREPARING HALOGENATED POLYMERS

Robert A. Findlay, Bartlesville, Okla., assignor to Phillips Petroleum Company, a corporation of Delaware Application March 11, 1957, Serial No. 645,309

11 Claims. (Cl. 204—163)

This invention relates to a novel method for preparing halogenated polymers of 1-olefins. In one of its aspects, this invention relates to a method of halogenating 1-olefin polymers as prepared in the presence of a chromium oxide catalyst dispersed in a hydrocarbon.

While halogenation of polymers of 1-olefins such as polyethylene is known to the art, it has been believed by the art that the polymer as prepared in a hydrocarbon solvent had to be first recovered as solid polymer and then dissolved in a suitable solvent for halogenation. The usual solvents used in the polymerization zone are subject to halogenation and while the polymer can be halogenated, the solvent would also be halogenated, thereby using excessive amounts of halogen and the solvent would have to then be discarded since the halogens are generally poisonous to the catalyst. Therefore, it is desirable to first separate polymer from the polymerization solvent and thereafter halogenating in a fully halogenated solvent such as carbon tetrachloride or tetrachloroethane.

In the copending application of Hogan and Banks, filed March 26, 1956, and having Serial No. 573,877, now Patent 2,825,721, a process is disclosed for producing novel polymers of 1-olefins, preferably having 2 to 8 carbon atoms per molecule and no branching nearer the double bond than the 4-position, by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature (450–1500° F., preferably 900–1000° F.) under non-reducing conditions and preferably with an oxidizing gas. While a suitable catalyst size is a catalyst size in the range of 100 to 40 mesh, the catalyst can be microspherical. The polymerization is suitably carried out in the liquid phase such as in solution in a hydrocarbon solvent, especially a paraffin or cycloparaffin (naphthene) which is liquid under the polymerization condition. This invention is particularly applicable to halogenation of polymers formed in hydrocarbon solvents such as that described as well as those polymers formed in hydrocarbon solvents by other methods known in the art such as the older high pressure polymerization of ethylene in the presence of diluents as well as the 1-olefin polymerizations with organo-metal catalyst such as those described by Karl Ziegler in Belgian Patent 533,362, dated November 16, 1954. In the copending application of Leatherman and Detter, filed June 11, 1956, and having Serial No. 590,567, a process is disclosed wherein 1-olefins are polymerized using the method of Hogan and Banks, supra, in a hydrocarbon diluent at a temperature below the precipitation temperature of the polymer so that polymer formed is in the form of discrete particles. This invention is also applicable to polymers formed in such a process.

I have now found that 1-olefin polymers can be halogenated without first recovering the solid polymer from the hydrocarbon diluent.

An object of this invention is to provide a novel process for halogenating 1-olefin polymer.

Another object of this invention is to provide a process of halogenating 1-olefin polymers where said polymers are prepared in a hydrocarbon diluent.

Still another object of this invention is to provide a novel process of chlorinating polyethylene prepared by polymerizing ethylene in a paraffin or cycloparaffin hydrocarbon in the presence of a chromium oxide catalyst.

Still other objects, advantages and features of this invention will be obvious to those skilled in the art having been given this disclosure.

According to this invention a polymer in a hydrocarbon diluent is admixed with a suitable halogenating solvent of higher boiling point than said hydrocarbon, the polymer is dissolved in the resulting admixture of hydrocarbon diluent and said halogenation solvent, the hydrocarbon is separated from the admixture by suitable means and the polymer is halogenated in the halogenation solvent. In one embodiment of the invention the catalyst is removed from the polymer solution preferably after the addition of the halogenating solvent and before the separation of the hydrocarbon diluent.

As has been indicated, this invention is applicable to 1-olefin polymers formed in a hydrocarbon diluent. Diluents or solvents generally used are paraffins and cycloparaffins having 3 to 12 carbon atoms per molecule. However, any hydrocarbon which is relatively inert, nondeleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

Suitable halogenation solvents are those which are preferably already at least partially halogenated. However, hydrocarbons can be used, but since the solvent is preferably recycled, it will become halogenated and will thereafter serve as the halogenation solvent without further consumption of the particular halogen.

The halogenation step of the present invention can be carried out by any method known to the art, however, for best results the halogenation should be carried out, at least in the initial phase, while the polymer is in solution. A preferred method of halogenation is that set forth in the copending application of P. J. Canterino, Serial No. 442,891, filed July 12, 1954. Generally, this involves putting the polymer in a volatile solvent such as carbon tetrachloride at a temperature above the normal boiling point of the solvent and a superatmospheric pressure sufficient to maintain the solvent substantially in the liquid phase, e.g., 80–120° C. and 5–100 p.s.i.g. A halogenation agent is then added. Usually, elemental halogen is passed through the solution until a partially halogenated product, usually containing about 15 weight percent combined halogen, is obtained. This intermediate product is soluble in carbon tetrachloride at atmospheric pressure and temperatures. The temperature and pressure can then be lowered, if lower temperature or pressure is desired, e.g., to 50–70° C. and atmospheric pressure, and the halogenation continued to the desired extent. Usually the chlorination is catalyzed with an actinic light such as ultra-violet. The solvent can be removed by volatilization and the halogenated polymer recovered as a residue or an antisolvent can be added to precipitate the halogenated polymer which can then be recovered by filtration.

Another suitable halogenation method is described in copending application of Canterino and Baptist, Serial No. 446,666, filed July 9, 1954. This involves conducting the initial halogenation (up to at least about 15 weight percent combined halogen) with the polymer in solution in a solvent such as 1,1,2,2-tetrachloroethane, and any further chlorination desired can be conducted with carbon tetrachloride or similar compound as the solvent.

While both of the above cases are primarily directed to chlorination, other halogens can be employed and solvent halogenated with the other halogens such as bromine and iodine can be employed as the solvent. Also in each of the foregoing methods, the entire halogenation can be carried out under the conditions of the initial halogenation if desired.

In one embodiment of the present invention, the polymer in diluent is removed from the polymerization reaction zone, after recovery of unreacted monomer, and is admixed with a hot halogenation solvent at a temperature above the solution temperature of the polymer after which the polymerization diluent is removed preferably by fractional distillation. In such a system, the halogenation solvent will be selected so as to have a higher boiling point than the polymerization diluent and can be separated by conventional fractionation means. For example, if the polymerization solvent is pentane then carbon tetrachloride can be used as the halogenation solvent. If, on the other hand, the polymerization solvent is cyclohexane, for example, then a halogenation solvent such as monochlorobenzene will be employed. Examples of suitable chlorination solvents include carbon tetrachloride (o, m, or p) dichlorobenzene, monochlorobenzene, chloroform, dichloroethane, trichloroethane, tetrachloroethane and the like or other halogenated solvents of the particular halogen being used. It is within the skill of the art to choose a halogenation solvent which can be separated from the polymerization diluent. When a low boiling point solvent such as carbon tetrachloride is used in conjunction with a high molecular weight polymer, it is frequently preferred to carry out the separation of the hydrocarbon diluent and the halogenation solvent at atmospheric pressure or lower and then to redissolve any precipitated polymer by putting the solvent under pressure and raising the temperature.

Of the halogenated polymers, the chlorinated material, especially of polyethylene, is by far the most widely used material commercially. For that reason, I will further described my invention wherein polyethylene as prepared in solution in the presence of a chromium oxide catalyst is chlorinated. However, I do not intend to be limited to such a halogenation, but any of the 1-olefin polymers or copolymers can be conveniently halogenated by the process of this invention.

Referring to the drawing, a feed stream consisting essentially of the polymerizable 1-olefin, ethylene for example, is passed to polymerization zone 1 via conduit 2. Catalyst is introduced to said polymerization zone 1 via conduit 3. The catalyst will usually be dispersed in at least a portion of the solvent. Any additional solvent (cyclohexane) is added to polymerization zone 1 via conduit 4. The ingredients in each of these conduits 2, 3 and 4 are preferably at polymerization temperature (285° F.), however, one or more streams can be cooler with remaining streams warmer so that the resulting dispersion is at the proper temperature. It should also be understood that the 1-olefin and solvent can be premixed, if desired. Stirrer 5 is provided to keep the contents of the reactor under agitation during the reaction. The reactor is under sufficient pressure to maintain the ethylene in the liquid state, for example, 450 p.s.i.g. The polymerization reaction is exothermic so that it is necessary to remove heat from the polymerization zone. This can be accomplished by indirect heat exchange, for example, cooling water or preferably solvent (cyclohexane) in conduit 6. The polymerization zone effluent, at about 280° F. from zone 1 passes via conduit 7 to monomer removal zone 8 wherein unpolymerized ethylene is flashed by releasing pressure and recycled to the system via conduit 9. The polymer solution from zone 8 is removed via conduit 10. Hot halogenation solvent (for example, monochlorobenzene) at a temperature above the solution temperature of the polymer, say of at least 240° F., is added to the stream of polymer solution in conduit 10 via conduit 11. This stream is heated via heat exchanger 12. The mixed stream of polymer in cyclohexane and monochlorobenzene passes via conduit 13 to fractionator 14 wherein the cyclohexane passes overhead via conduit 15 to dechlorination zone 16. In this zone any chlorinated solvent or elemental chlorine is removed by first condensing the solvent and thereafter passing same through a bed of alumina or other suitable absorbent. The thus dechlorinated solvent is recycled to the polymerization zone via conduit 17.

The monochlorobenzene, now containing the polymer as a solution therein passes from fractionation zone 14 via conduit 18 to halogenation vessel 19. This vessel is provided with agitation means such as stirrer 20 and an actinic light source 21. The halogenation agent such as chlorine is added via conduit 22. Should the polymer not be fully soluble in the monochlorobenzene at the operating temperature of fractionation zone 14, then heat can be added to zone 19 along with sufficient pressure to maintain the solvent in liquid phase. The reactants from halogenation zone 19 pass via conduit 23 to separation zone 24 wherein unreacted halogen is removed and passes overhead via conduit 26, solvent is removed via conduit 25 and is recycled to conduit 11 and polymer is removed via conduit 27 and passed to further processing as desired.

A second embodiment of the invention is carried out as described hereinabove except that the solution of polymer resulting in line 13 upon the introduction of hot halogenation solvent via line 11 is passed via conduit 28 to catalyst removal zone 29 wherein catalyst is removed by any suitable means such as filtration, centrifugation, and the like. Substantially catalyst-free polymer solution is returned therefrom to conduit 13 via conduit 30, and catalyst is withdrawn via conduit 31. The remaining steps of hydrocarbon diluent removal, halogenation and polymer recovery are then carried out as described hereinabove.

Catalyst removal zone 29 can comprise any conventional means for separating finely divided suspended solid particles (the catalyst) from the liquid phase (the solution of polymer in the hydrocarbon diluent-halogenation solvent admixture). Filtration and centrifugation are presently preferred methods of catalyst removal, although agglomeration and settling as well as other methods can be employed.

It is a feature of this invention, when the catalyst removal embodiment is employed, that the halogenation solvent is added to the polymer solution or slurry at a point upstream from the catalyst removal zone as described. In the case of a solution polymerization process, the addition of the halogenation solvent to the solution of polymer in cyclohexane, for example, results in a polymer solution of lower concentration, and hence lower viscosity. Catalyst removal, by filtration, centrifugation or other methods, is thereby facilitated and the amount of cyclohexane to be subsequently removed from the solution of polymer in the halogenation solvent is minimized.

In the case of a slurry polymerization process, in which the catalyst normally is not removed from the polymer, the invention makes possible a catalyst removal step without requiring any additional dilution or other processing steps. Thus, a catalyst removal step can be carried out on the solution of polymer obtained upon the addition of the hot halogenation solvent to the polymer slurry, preferably prior to the removal of the polymerization diluent. Such a procedure greatly facilitates the production of a catalyst-free polymer, for subsequent halogenation, from the slurry polymerization process.

*Specific embodiment*

An ethylene stream comprising approximately 95 percent ethylene with the remainder of the feed being primarily ethane with lesser amounts of methane and propane along with trace amounts of other hydrocarbons is polymerized in a continuous process in the presence of a chromium oxide-silica-alumina catalyst according to the method of Hogan et al. The ethylene stream is first admixed with cyclohexane as solvent and is continuously passed to a reaction zone wherein the temperature is maintained at about 285° F. under a pressure of about 450 p.s.i.g. Catalyst of microspherical dimensions and consisting essentially of chromium oxide is about 2.5 percent chromium on a 90 percent silica-10 percent alumina support is also fed to the reaction zone at a rate to maintain the catalyst concentration in said reaction zone at approximately 0.1 weight percent. This catalyst has been activated by calcining at 950° F. in the presence of anhydrous air (i.e., dew point no higher than 0° F.).

The reaction zone is designed to provide for an average residence time of 2 hours. The reactor effluent is first flashed at 260° F. and 65 p.s.i.g. to remove unreacted monomer after which the catalyst can be removed by any suitable means as previously described if so desired. The concentration of polymer in cyclohexane at this stage of the operation is about 6 weight percent. To the polymer solution is added an equal volume of monochlorobenzene at a temperature of 260° F. and the admixture is passed to a catalyst removal zone wherein the catalyst is separated from the polymer solution by filtration. The substantially catalyst-free polymer solution is then passed to fractionation zone wherein the temperature is maintained and the pressure is dropped to atmospheric whereby the cyclohexane is vaporized and passes overhead leaving the polymer in solution in the monochlorobenzene. This solution is passed to the chlorination zone wherein chlorine is passed at a ratio of 1 weight part chlorine for each 6 parts of polymer. The chlorination zone is provided with an ultra-violet light source and is designed to provide for a 1 hour average residence time. The product from this zone contains about 37 percent chlorine.

This invention has been described in a preferred embodiment, those skilled in the art will see many modifications. For example, if the polymer is prepared in pentane, carbon tetrachloride can be employed as the chlorination solvent using sufficient pressure to maintain the carbon tetrachloride in liquid phase at the temperature required to keep the polymer in solution. In those cases wherein the polymer as formed is in discrete particles (particle form) the diluent solvent can be replaced by the halogenation solvent and the temperature and pressure applied to dissolve the polymer at least during the initial stage of the halogenation.

I claim:

1. A method of transferring a polymer of a 1-olefin from solution in a hydrocarbon solvent to a halogenated solvent to halogenate said polymer, said method comprising mixing said solution with a halogenated hydrocarbon solvent of higher boiling point than said hydrocarbon solvent, fractionating the resulting mixture to remove said hydrocarbon solvent thereby leaving said polymer in said halogenated solvent and thereafter halogenating said polymer.

2. A process for preparing halogenated 1-olefin polymers which comprises polymerizing said olefin in the presence of a hydrocarbon solvent, mixing the resulting polymer solution with a halogenated hydrocarbon solvent of higher boiling point than said hydrocarbon solvent, subjecting the resulting mixture to fractional distillation to remove said hydrocarbon solvent, subjecting the remaining halogenated hydrocarbon solvent and polymer to sufficient temperature and pressure to maintain the polymer in solution, introducing a halogenating agent under halogenation conditions to the polymer in solvent solution and thereafter recovering halogenated polymer.

3. The process of claim 2 wherein the halogenating agent is a chlorination agent.

4. A process for preparing a solution of a 1-olefin polymer in a halogenated solvent which comprises polymerizing a 1-olefin in the presence of a hydrocarbon diluent, mixing the resulting polymer in diluent with a halogenated solvent of higher boiling point than said hydrocarbon diluent, fractionating said hydrocarbon diluent from the resulting mixture and dissolving said polymer in said halogenated solvent.

5. A process for preparing halogenated polyethylene which comprises polymerizing ethylene in a hydrocarbon diluent in the presence of a chromium oxide catalyst under suitable temperature and pressure to maintain the resulting diluent in liquid phase, removing unreacted ethylene from the reaction materials, admixing a halogenated solvent to the polymer-hydrocarbon mixture having a higher boiling point than said hydrocarbon, subjecting the resulting mixture to fractional distillation thereby removing said hydrocarbon, maintaining the polymer in solution in the halogenated solvent, subjecting the polymer to a halogenating agent in the presence of actinic light, and thereafter recovering the halogenated polymer from solution.

6. The process of claim 5 wherein the halogenation agent is a chlorination agent.

7. The process of claim 6 wherein the hydrocarbon is pentane, the halogenated solvent is carbon tetrachloride and the halogenating agent is elemental chlorine.

8. The process of claim 6 wherein the hydrocarbon is cyclohexane, the halogenated solvent is tetrachloroethane and the halogenation agent is elemental chlorine.

9. The process of claim 6 wherein the hydrocarbon is cyclohexane, the halogenated solvent is monochlorobenzene and the halogenation agent is elemental chlorine.

10. A process for preparing chlorinated polyethylene which comprises polymerizing ethylene in a hydrocarbon solvent in the presence of a chromium oxide catalyst at a temperature below the precipitation temperature of the polymer being formed, admixing the resulting polymer solvent mixture with a halogenated hydrocarbon solvent having a boiling point higher than said hydrocarbon solvent under temperature and pressure conditions to dissolve said polymer in said halogenated hydrocarbon solvent, removing said chromium oxide catalyst from the resulting solution, removing the hydrocarbon solvent by fractional distillation, subjecting the resulting solution to a chlorination agent under chlorinating conditions until said polymer is chlorinated to the desired degree, and thereafter recovering the chlorinated polymer.

11. The process of claim 10 wherein the hydrocarbon solvent is pentane, the halogenated hydrocarbon solvent is carbon tetrachloride, the chlorination agent is chlorine and the chlorination is carried out in the presence of ultra-violet light.

References Cited in the file of this patent

UNITED STATES PATENTS

| 2,268,415 | Morway et al. | Dec. 30, 1941 |
| 2,291,574 | Gleason et al. | July 28, 1942 |
| 2,398,803 | Myles et al. | Apr. 23, 1946 |
| 2,481,188 | Babayan | Sept. 6, 1949 |

FOREIGN PATENTS

| 530,617 | Belgium | Jan. 24, 1955 |